UNITED STATES PATENT OFFICE.

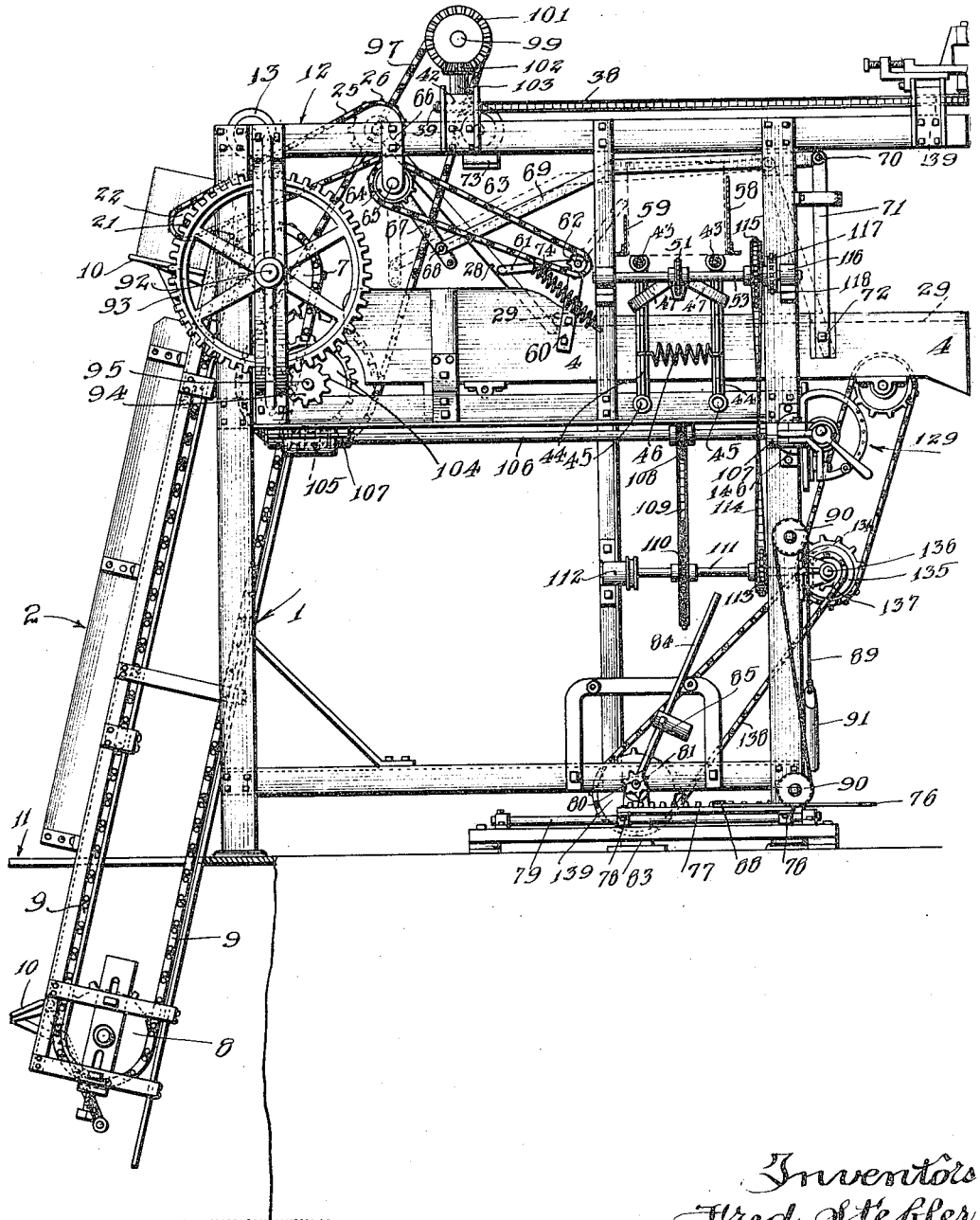

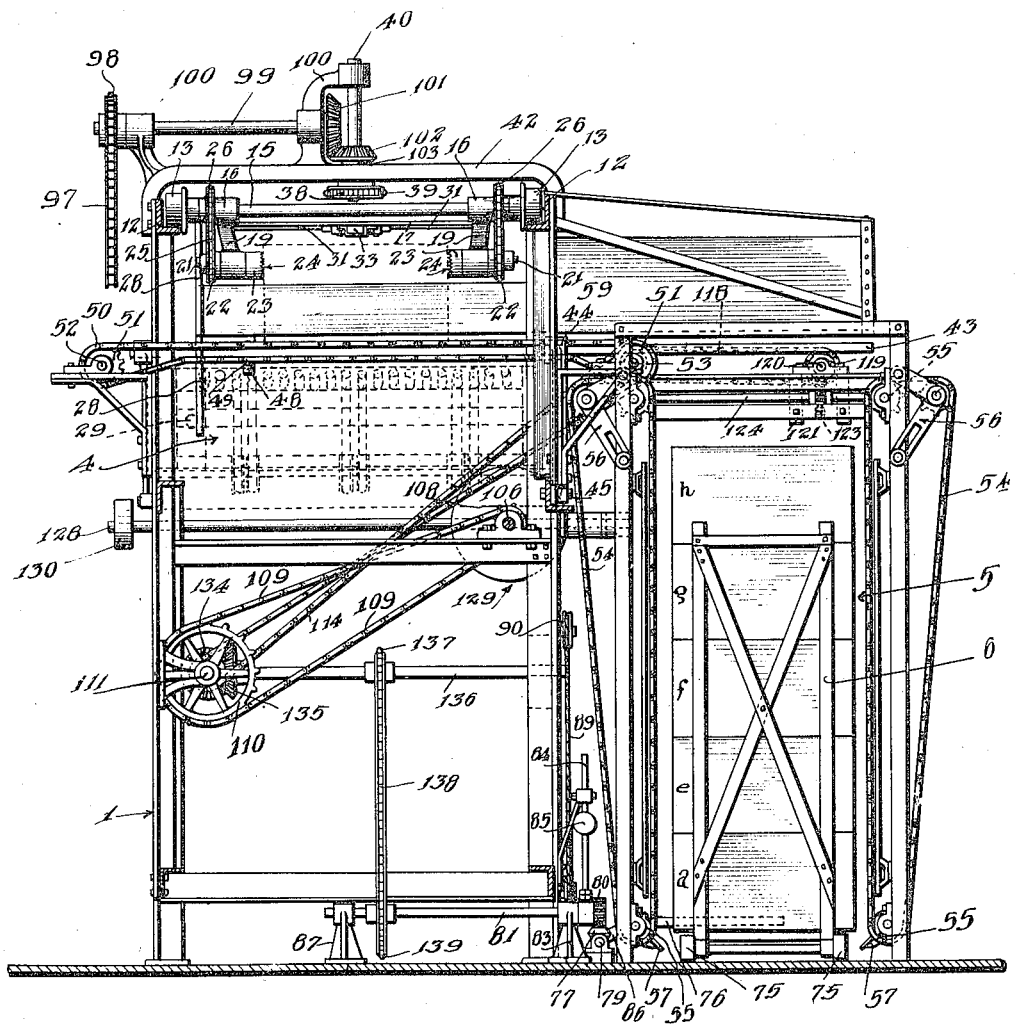

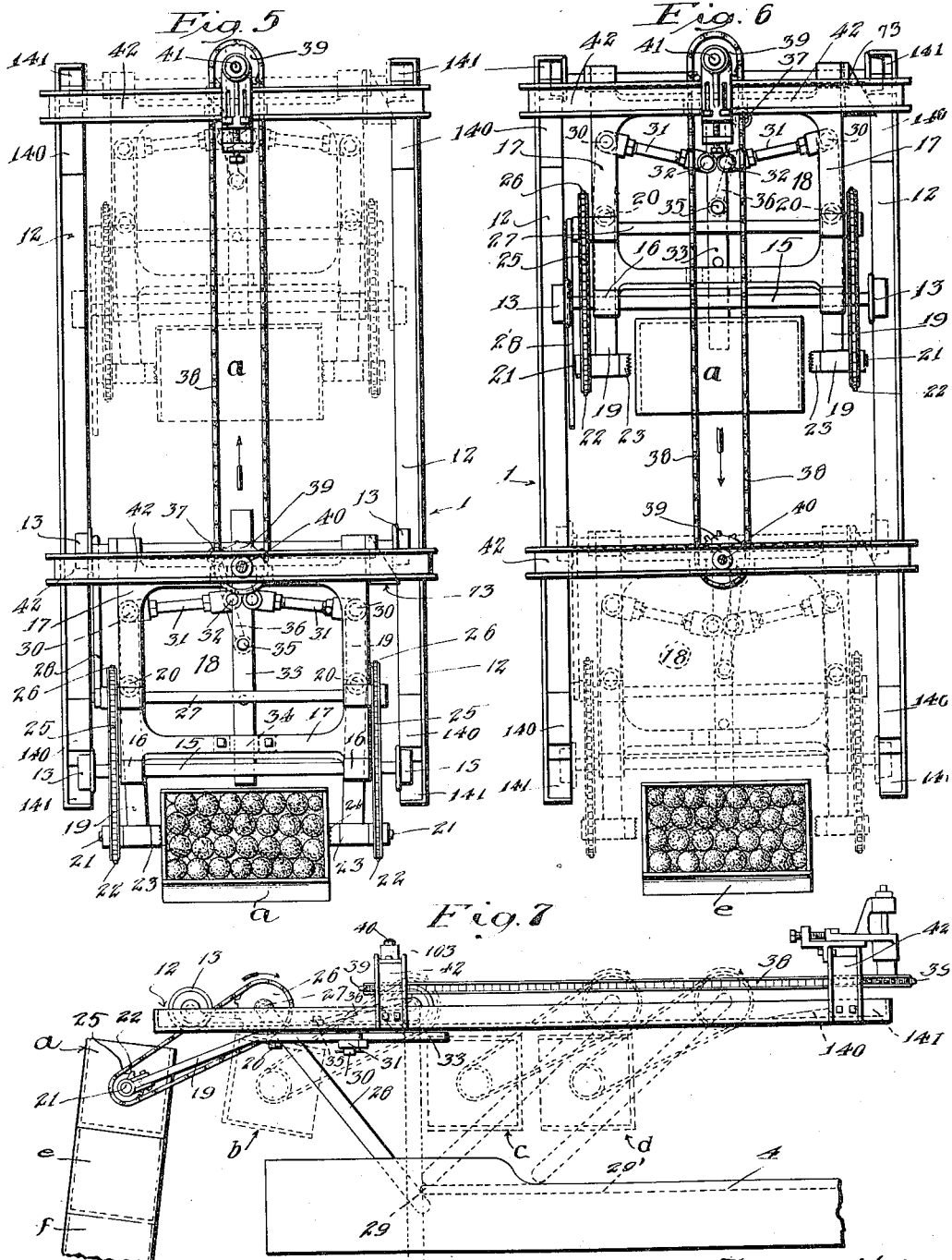

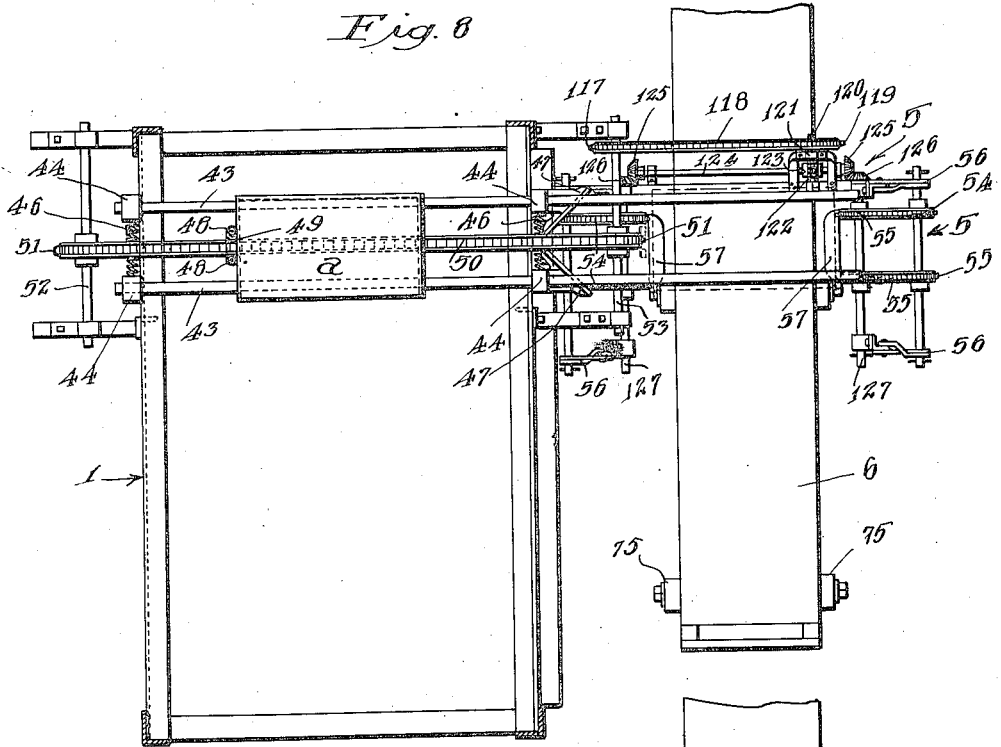
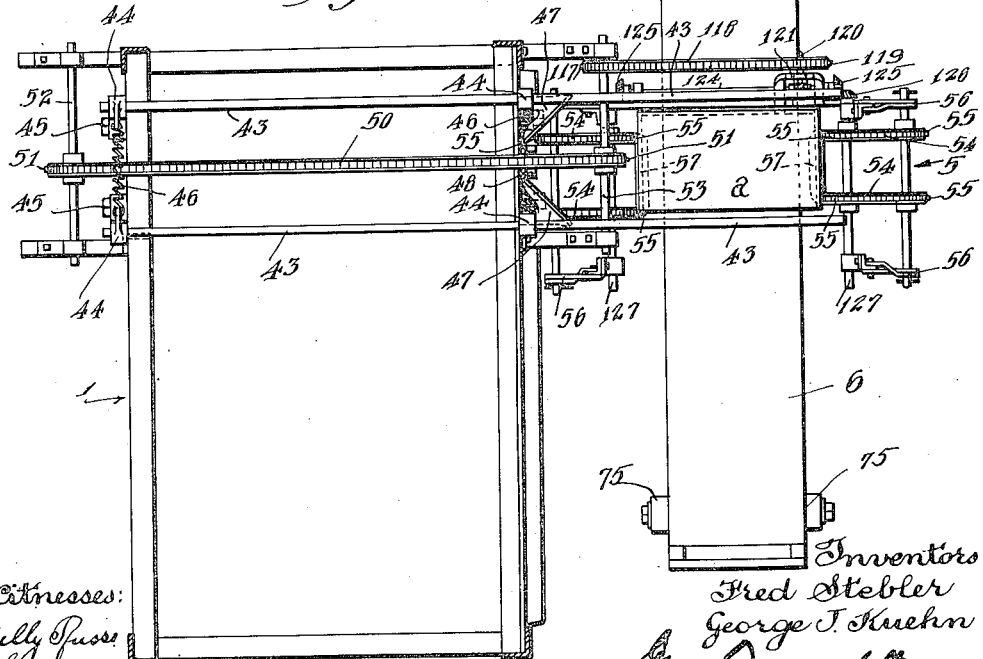

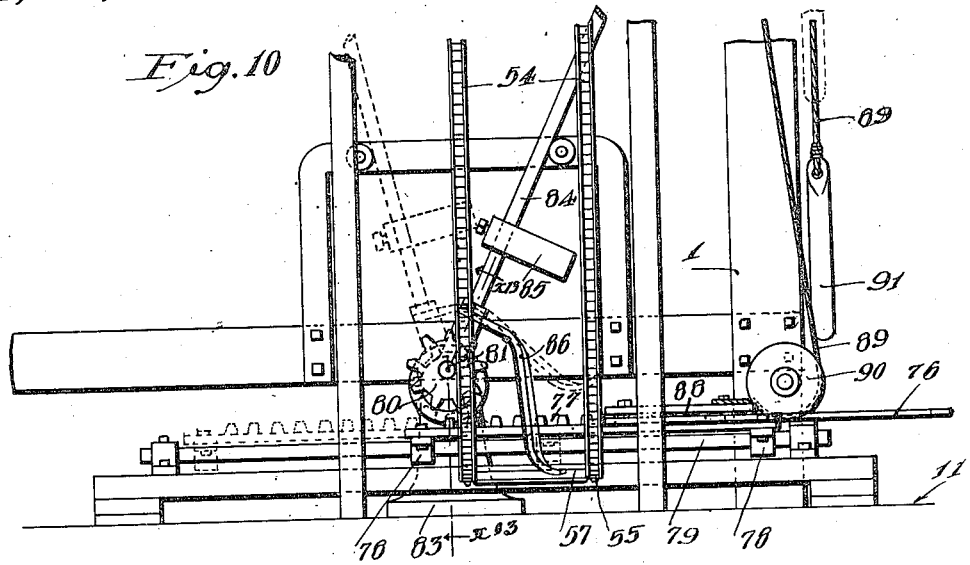
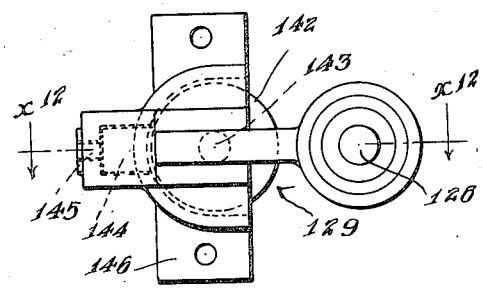
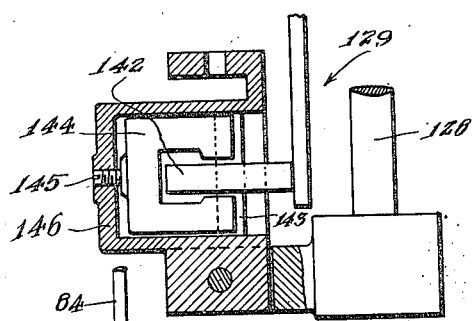
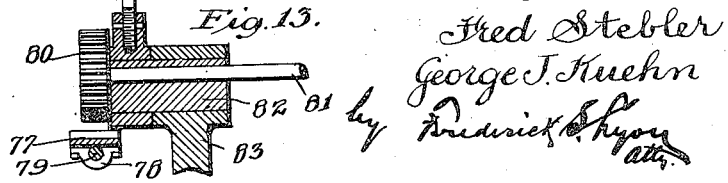

FRED STEBLER AND GEORGE J. KUEHN, OF RIVERSIDE, CALIFORNIA.

BOX-HANDLING APPARATUS.

1,290,675.  Specification of Letters Patent.  Patented Jan. 7, 1919.

Application filed June 23, 1915. Serial No. 35,828.

*To all whom it may concern:*

Be it known that we, FRED STEBLER and GEORGE J. KUEHN, citizens of the United States, residing at Riverside, in the county of Riverside and State of California, have invented a new and useful Box-Handling Apparatus, of which the following is a specification.

This invention relates to devices of the character designed to receive boxes of fruit and to dump the fruit from the boxes into a suitable receptacle such as, for instance, the hopper of a fruit grader, and to discharge the empty boxes in tiers ready for transportation to any desired point for further use.

An object is to make provision for stacking and discharge of the boxes in tiers.

Another object is to effect the stacking and discharge by mechanism that is simple and that operates with maximum precision and accuracy.

Another object is to make provision for dumping the fruit from the boxes with a pushing movement of the box so as to distribute the fruit and not heap it in one spot.

Another object is to dump the fruit directly into the hopper of the grader from the boxes and then carry the boxes over the hopper to the stacker.

Another object is to effect the dumping operation by reliable mechanism.

Further objects and advantages may appear as the invention is unfolded in detail in the subjoined description and in the drawings filed herewith.

The accompanying drawings illustrate an embodiment of the invention.

Fig. 3 is a side elevation from line indicated by $x^3$—$x^3$, Fig. 1.

Fig. 4 is an elevation looking at the feed end of the apparatus, the feed elevator being omitted.

Fig. 5 is a plan view of the box dumping mechanism, solid lines and broken lines showing the carriage in different positions.

Fig. 6 is a plan view analogous to Fig. 5 showing the carriage in the same positions as in Fig. 5, the operating parts of said carriage being shown in different positions than in said Fig. 5.

Fig. 7 is a side elevation of the box dumping mechanism from the right of Fig. 5.

Figs. 8 and 9 are plan views of the conveyer and stacker, a portion of a discharge conveyer truck also being shown. In Fig. 8 the conveyer rails are in closed position with a box resting thereon and in Fig. 9 said rails are spread apart to allow for discharge of the box therefrom.

Fig. 10 is an enlarged fragmentary detail of some of the parts of the truck moving mechanism.

Fig. 11 is an enlarged detail of the friction drive idler.

Fig. 12 is a plan section on line indicated by $x^{12}$—$x^{12}$, Fig. 11.

Fig. 13 is an enlarged detail mainly in section on line indicated by $x^{13}$—$x^{13}$, Fig. 10.

Figure 1:
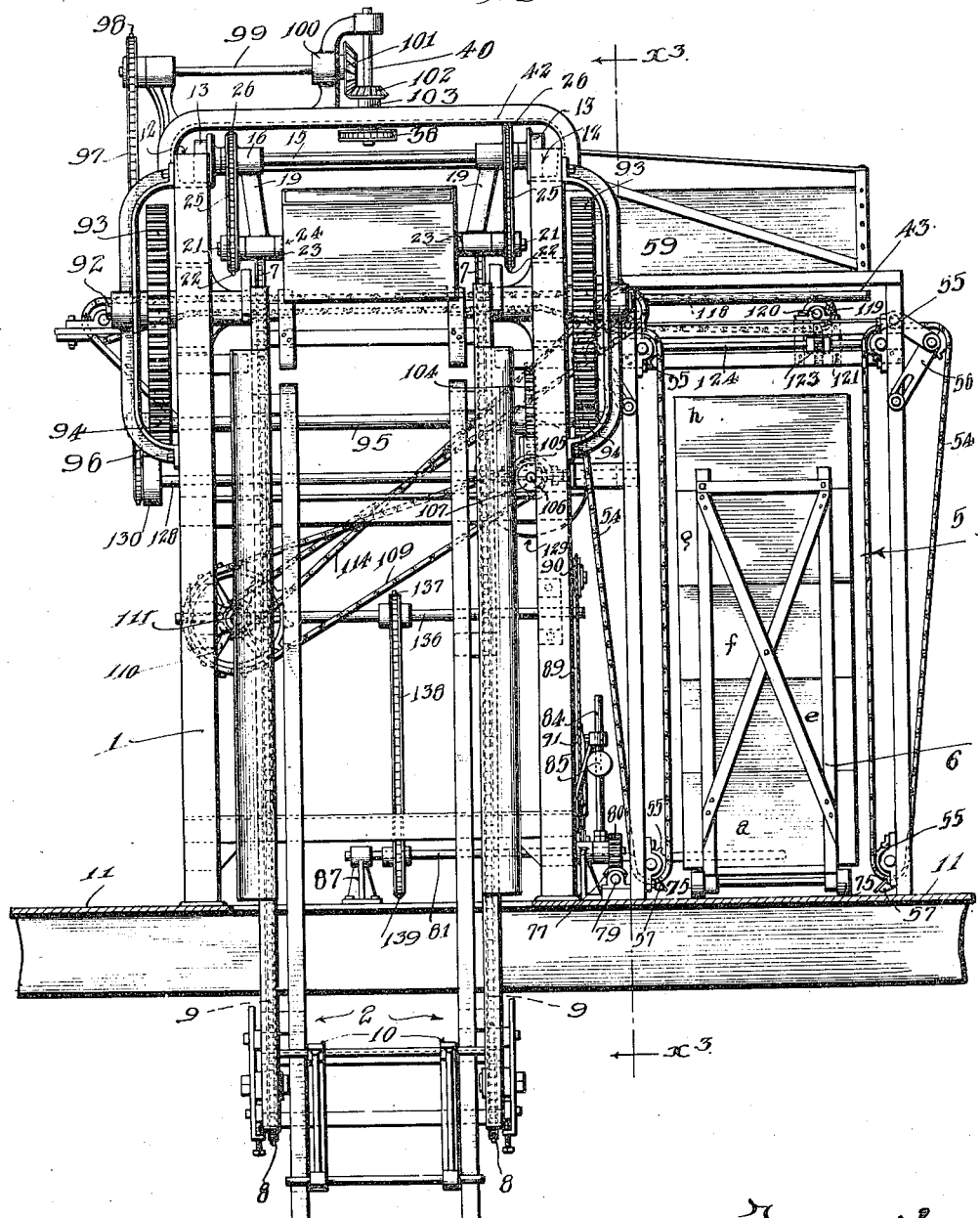
Figure 1 is an elevation of a box handling apparatus built in accordance with this invention and looking at the feed or receiving end thereof.
Figure 2:
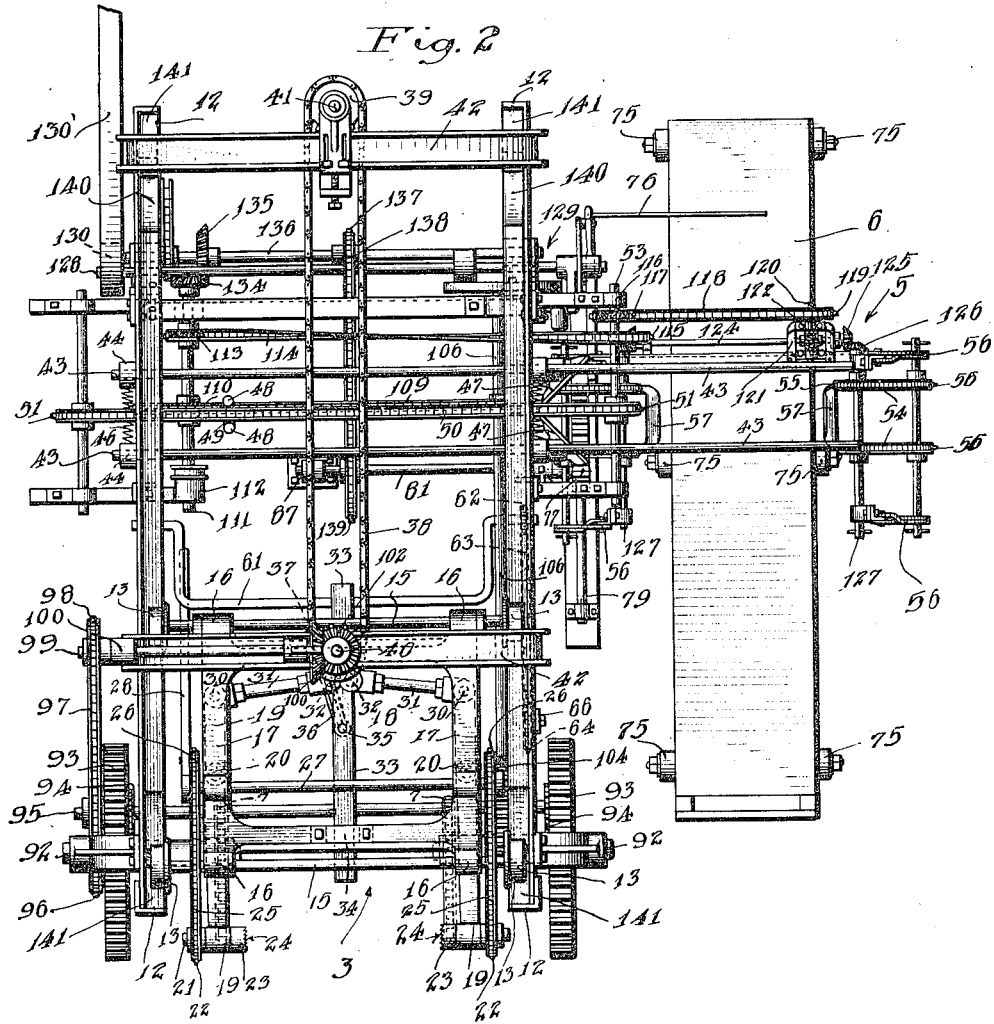
Fig. 2 is a plan view of Fig. 1, the feed elevator being omitted.

There is provided a suitable frame 1 of any preferred construction, said frame not being described in detail herein as it is within the skill of persons skilled in the art to construct the same.

There is provided a suitable receiving or feed elevator indicated in general at 2 which elevates the loaded boxes to box dumping mechanism 3 that discharges or dumps the contents of the boxes into a receptacle such as a grader 4 and that discharges the empty boxes into a stacker 5 which in turn stacks the empty boxes onto a suitable conveyer that in the instance shown is formed of trucks 6, only one of which is shown in the drawings.

The elevator 2 is provided with upper and lower sprockets 7, 8 around which run endless chains 9 which carry platforms 10 of any preferred construction, said platforms 10 when the sprockets are turned being designed to raise successive tiers of boxes from the foot of the elevator to the head of the elevator and the foot of the elevator preferably being located beneath the floor 11 so that the boxes may be raised directly from said floor or from a truck, not shown, on which the boxes have been transported to the elevator.

The dumping mechanism 3 extends horizontally from the head of the elevator 2 and is provided with parallel tracks 12 to support flanged wheels 13 mounted on the ends of axles 15 which are journaled at 16 to a carriage frame 17 of any suitable construction, said carriage frame in the instance shown being provided with a central orifice 18. Pivoted to the frame 17 near the sides thereof are levers 19 having their forward ends deflected downward from the pivots 20 and provided with stub shafts 21 carrying at their outer ends sprocket wheels 22. The inner ends of the stub shafts 21 are provided with opposing jaws 23 which are preferably provided with teeth 24 to engage the ends of the boxes raised by the elevator 2 to position between said jaws. The sprocket wheels 22 are engaged by endless sprocket chains 25 which are operated by sprocket wheels 26 mounted outside the frame 17 near the ends of a shaft 27 that is journaled on the frame 17.

The shaft 27 is provided at one end with an operating arm 28 which when the carriage is at the forward end of the tracks 12, has the path of movement of its free end intersecting a stop 29 formed by the rear end of a longitudinal shoulder 29' extending along one side of the receptacle 4, so that movement of the carriage forward along the rails will cause the arm 28 to turn, thus turning the jaws 23 and any box that may be held at the time by said jaws, so as to dump or discharge the contents of the box therefrom into the receptacle 4. As the carriage moves farther forward the free end of the arm rides along the shoulder 29', the length of the arm and the position of the rail relative to the arm being such that the jaws are rotated through an arc of substantially two hundred seventy degrees or three quarters of a turn so that any box held by the jaws will be turned from the fruit-holding position with open side up as in solid lines a, Fig. 7, through discharge and turning positions indicated at b, c, to discharge position d with the open side of the box facing the feed end of the apparatus.

The forward ends of the levers 19 are pivoted at 30 to toggle links 31 which are pivoted at 32 to a toggle bar 33 shiftably connected at 34 to the frame 17, said toggle bar being pivoted at 35 to a pitman 36 that is pivoted at 37 to an endless chain 38 running around sprockets 39. The sprocket wheels 39 are mounted on shafts 40, 41 respectively, journaled on cross bars 42 which are supported by the tracks 12.

The dumping mechanism preferably includes a conveyer provided with parallel rails in the form of round rods 43 extending parallel to one another and transverse to and beneath the tracks 12, said rails being shiftably mounted to move toward and from one another, and supported by arms 44 which are pivoted at 45 to the frame 1, said arms being drawn inward toward one another by springs 46 so that the distance between the rails 43 will be less than the widths of the boxes which are to traverse said rails. The arms 44 are provided near their upper ends with inwardly, rearwardly and upwardly slanting fingers 47 designed, when the arms 44 are in their inward positions, to extend into the path of motion of a trip formed in this instance by rollers 48 mounted on the ends of a cross piece 49 which is fastened to an endless chain 50, said rollers 48 also functioning as box engaging means and said chain 50 extending longitudinally midway between the rails 43 and running around sprockets 51, that are mounted on shafts 52, 53, respectively; turning of the sprockets causing the rollers 48 to shift lengthwise of the rails 43 to slide boxes that may be engaged by the rollers, along said rails.

The stacker 5 is provided immediately beneath the discharge end of the rails 43 with oppositely arranged pairs of endless chains 54 running around sprocket wheels 55 so mounted on the frame 1 that the inner limbs of the chains will move in vertical lines between the sprockets, said chains also running over tightening devices 56. The chains 54 of each pair are connected to one another by transversely extending lugs 57 to support the boxes when they are discharged from the conveyer rails 43.

Vertical guides 58, 59 are provided above the rails 43, said guides being spaced apart the width of the boxes so as to admit the boxes therebetween when said boxes are discharged from the conveyer rails 43. When the boxes are discharged, they may not always fall sufficiently straight to pass between the guides 58, 59, and the box corner nearest the guide 59 may strike and rest on said guide, and, to insure that the boxes pass downward between the guides to rest on the rails, we provide the following construction.

The hopper 4 is provided with standards 60, the upper ends of which journal a U-shaped knocker-bar 61 having on one end a sprocket wheel 62 driven by a sprocket chain 63 that is in turn driven by a sprocket wheel 64 on a shaft 65 journaled at 66 to the frame 1. The shaft 65 is provided with an operating crank arm 67 pivoted at 68 to one end of an angularly bent connecting rod 69 which is pivoted at its other end at 70 to an upright oscillatory arm 71 that is pivoted at its lower end at 72 to the hopper 4. The connecting rod 69 and arm 71 are directly in the path of a wedge-shaped tripping lug 73 of the carriage frame 17, the apex of the lug being at the front end thereof so that said lug will slide past the connecting rod 69 when the carriage travels forward and the abrupt face of the lug facing rearward so that when the carriage travels rearward, said lug will engage the forward end of the connecting rod 69 and trip the same, thus swinging the arm 67 to move the knocker-bar 61 against any box that may be resting on the guide 59 and knock or push said box into the space between the guides 58, 59, which act to guide all of the boxes in perfect alinement with one another. The knocker-bar 61 is retracted by reverse movement of the chain 63, said reverse movement being effected by a coil spring 74 connected at its opposite ends to said chain and to the frame 1.

Boxes are discharged in succession from the rails 43 to form a complete stack or tier of boxes supported by the lugs 57 which are caused to travel downward by means hereinafter described so as to allow the lowermost box of the tier to come to rest on the floor of the truck 6, said truck having wheels 75 to roll on the floor 11.

Means are provided to shift the truck 6 endwise, step by step, distances corresponding to the width of a tier of boxes so that when one tier is complete other boxes discharging from the rails 43 will discharge alongside of the boxes of the completed tier to form another tier and so on, and said means will now be described.

There is provided a movable angular shifter arm 76 having one end extending over the path of movement of the platform of the truck so that the path of movement of the arm will intercept the lowermost box of the last tier of boxes discharged onto said truck. The other end of said arm 76 is provided with a rack 77 having sliding connections 78 with a guide rod 79 which is mounted on the frame 1. Just over the rack 77 and alined therewith is a pinion wheel 80 mounted near one end of a shaft 81 which is journaled near one end in an eccentric bearing 82 that is mounted to oscillate in a support 83, see Fig. 13. The eccentric bearing is provided with an operating arm 84 having an adjustably mounted weight 85 and having near its lower end an irregularly bent trigger 86 that has its free end intersecting the path of upward movement of one of the lugs 57 so that at the beginning of said upward movement, the trigger 86 will be caused to move, thus throwing the arm 84 from the solid line position in Fig. 10 to the dotted line position, and thereby moving the pinion wheel 80 into mesh with the rack 77 so that operation of the pinion wheel, as hereinafter provided for, will move the arm 76, from the solid line position shown in Fig. 10 to the dotted line position and thereby shift the truck 6. The shaft 81 is provided near its opposite end with a bearing 87.

The pinion wheel 80 is thrown out of commission and the arm 76 is reversely moved to retracted position spaced apart from the last completed tier of boxes by means which will now be described. The rack 77 is provided with a stop 88 of which the path of movement is intersected by the pinion wheel 80 so that, when the rack has traveled far enough to bring the stop 88 into engagement with the pinion wheel, said pinion wheel will climb upward onto the stop thus moving the arm 84 from the dotted line position in Fig. 10 to the solid line position, and thereby turning the eccentric bearing 82 so as to raise the pinion wheel completely out of mesh with the rack 77. Retraction of the rack 77 then occurs by reason of there being a cable 89 fastened at one end to the rack 77 and rove around sheaves 90 and provided at its other end with a weight 91 which is acted on by gravity to move the rack from the dotted line position in Fig. 10 to the full line position.

That portion of the gearing which connects the elements of the gearing hereinbefore described, will now be described. The upper elevator sprockets 7 are mounted on stub shafts 92 provided with spur gears 93 which mesh with spur pinions 94 mounted on a shaft 95. The shaft 95 is also provided with a sprocket wheel 96 meshing with a sprocket chain 97 which in turn engages a sprocket wheel 98 mounted on one end of a jack shaft 99 that is journaled at 100 on the frame 1 and that is provided at its opposite end with a beveled gear wheel 101 meshing with beveled gear wheel 102 mounted on the shaft 40, said shaft 40 being journaled at 103 on the frame and said shaft 40 thus being driven to drive the sprocket chain 38.

The shaft 95 is also provided with a worm wheel 104 meshing with a worm 105 on a horizontal worm shaft 106 journaled at 107 on the frame 1. The worm shaft 106 is provided with a sprocket wheel 108 meshing with a sprocket chain 109 which engages a sprocket wheel 110 that is mounted on a jack shaft 111 journaled at 112 on the frame 1. The shaft 111 is provided with a sprocket wheel 113 meshing with a sprocket chain 114 which engages a sprocket wheel 115 mounted on the shaft 53 which is journaled at 116 on the frame 1 and which thus turns the sprocket wheel 51 on said shaft to drive the sprocket chain 50.

The shaft 53 is also provided with a sprocket wheel 117 engaging a sprocket chain 118 which meshes with a sprocket wheel 119 that is mounted on a worm shaft 120 journaled at 121 on the frame 1. The shaft 120 is provided with a worm 122 meshing with a worm wheel 123 on a shaft 124. The shaft 124 is provided at both ends with beveled gear wheels 125 meshing with beveled gear wheels 126 on shafts 127, on which are mounted the upper discharge elevator sprocket wheels 55.

The shaft 106 is driven from the main power shaft 128 through a friction drive of the usual or any preferred construction indicated in general at 129, said power shaft receiving its power from any suitable source, not shown, there being a pulley 130 mounted on said power shaft to receive the power through a belt 130'.

The shaft 111 is provided with a beveled gear 134 meshing with a beveled gear 135 mounted on a horizontal jack shaft 136 which is provided with a sprocket wheel 137 turning a sprocket chain 138 that engages a sprocket wheel 139 mounted on the shaft 81 so as to turn said shaft and thereby operate the pinion wheel 80 to move the arm 76 for the purpose hereinbefore set forth.

The tracks 12 are provided near their ends with inclined faces 140 so as to produce notches 141 designed to hold the carriage wheels 13 stationary when the pitman pivot 37 is being moved from side to side around the sprocket wheels 39, which movement causes opening and closing of the jaws 23 according as the carriage is at one end or the other of its movement.

As clearly shown in Figs. 11 and 12 the friction drive 129 besides having the usual inter-engaging disks is provided with a thrust disk or idler 142 mounted on a stud 143 which is loosely journaled in an adjustable bearing 144 that can be adjusted by turning of the screw 145 mounted in a bracket 146 on the frame 1.

The ratios of the gearing hereinbefore described are such as to effect the necessary relative timing of the various parts to effect the various operations hereinafter described. It is understood that the term "box" employed in this specification defines any desired form of receptacle.

In practical operation, assuming that the pulley 130 is being turned by suitable power and that the friction drive 129 is in commission, boxes of fruit will be deposited at the foot of the elevator 2 by the attendant or any device employed for that purpose. One of the platforms 10 will then operate to raise the boxes in succession to the head of the elevator whereupon the jaws 23 will operate to clamp the box shown at a therebetween, and the carriage 17 will then be operated in its forward movement from the solid line position, Fig. 5, to the dotted line position, thus turning the box from the position a, Fig. 7, through position b, to position c, to dump the fruit from the box, continued motion of the carriage forward moving the box from position c through position d until the front wheels 13 engage the notches 141 and come to rest therein, while the chain 38 moves the pitman 36 into the position shown in Fig. 6, thus releasing the box a, whereupon the carriage returns to its former position at the rear end of the tracks 12 so that the jaws 23 will pick up and dump the next box e in the manner just described for the box a.

The box a discharges or drops downward and is knocked into perfect alinement with the guides 58, 59 by action of the knocker-bar 51 so that said box comes to rest on the rails 43. The rollers 48 operated by the chain 50 then push or slide the box a from the position shown in Fig. 8 to the position shown in Fig. 9. Reverse movement of the rollers 48 causes them to engage the fingers 47 and spread the same away from one another so as to spread the rails 43 apart, thus permitting the box a to drop between said rails and come to rest on the lugs 57, which at the time are near the head of the discharge elevator and which then move slowly downward so that as the next box e and succeeding boxes f, g, h, are discharged from the rails 43, said boxes will fall one on top of another in superposed relation to form a tier or stack of boxes as in Fig. 1, said tier or stack being supported by the lugs 57 which, by the time a predetermined number of the boxes, say five, have been stacked in one tier, move below the level of the platform of the truck 6, thus bringing the tier to rest on said truck.

Then the lug 57 on the chain 54 adjacent the trigger 86 engages said trigger and operates the same to move the spur pinion 80 into engagement with the rack 77, thus causing movement of the arm 76 against the lowermost box of the tier to move the tier of boxes a, e, f, g, h and the truck forward a distance corresponding to the width of the boxes, so that the truck is in position to receive the next succeeding tier of boxes which is formed in the same manner as just described for the formation of the first tier.

The machine will thus continue to operate as above described so long as boxes of fruit are supplied to it.

What we claim is:

1. In combination, a shiftably mounted carriage, jaws movably mounted on the carriage, and positive means operated by movement of the carriage to open the jaws.

2. In combination, a shiftably mounted carriage, jaws movably mounted on the carriage, means to reciprocate the carriage, and means connecting the jaws to the reciprocating means to hold the jaws closer together when the carriage moves in one direction and to hold the jaws farther apart when the carriage moves in the opposite direction.

3. In combination, a shiftably mounted carriage, jaws movably mounted on the carriage, means to reciprocate the carriage, a toggle bar shiftably mounted on the carriage, toggle links pivoted to the bar and connected to said jaws, and a pitman pivoted to the bar and to the reciprocating means.

4. In combination, a frame, a carriage shiftably mounted on said frame, jaws movably mounted on the carriage, sprocket wheels mounted on the frame, an endless sprocket chain engaging said sprocket wheels, means to turn one of the sprocket wheels, and means including a toggle device connecting the chain to the jaws to operate the jaws toward and from one another as the chain revolves.

5. In combination, a shiftably mounted carriage, levers pivoted to said carriage, jaws rotatively mounted on the levers, means to turn the jaws, and means operated by movement of the carriage to move the levers.

6. In combination, a shiftably mounted carriage, levers pivoted to said carriage, jaws rotatively mounted on the levers, means operated by movement of the carriage to turn the jaws, and means operated by movement of the carriage in one direction to move the levers one way and operated by movement of the carriage in the opposite direction to move the levers the other way.

7. In combination, a shiftably mounted carriage, levers pivoted to said carriage, jaws rotatively mounted on the levers, a stationarily mounted stop, a pivotally mounted arm having the path of movement of one end intersecting said stop, said arm being operatively connected to the jaws to turn said jaws, and means operated by movement of the carriage to move the levers.

8. In combination, a shiftably mounted carriage, levers pivoted to said carriage, jaws rotatively mounted on the levers, a stationarily mounted longitudinally extending shoulder, a pivotally mounted arm having the path of movement of one end intersecting the shoulder, said arm being operatively connected to the jaws to turn said jaws when movement of the carriage forces the arm against one end of the shoulder and said arm being designed to ride along said shoulder during further movement of said carriage, and means operated by movement of the carriage to move the levers.

9. In combination, a shiftably mounted carriage, levers pivoted to said carriage, jaws rotatively mounted on the levers, an arm connected to the jaws to turn said jaws, and means operative when the carriage is moved further to hold the arm against turning.

10. In combination, a shiftably mounted carriage, jaws rotatively mounted on the carriage, and means operated by movement of the carriage to rotate the jaws.

11. In combination, a shiftably mounted carriage, jaws rotatively mounted on the carriage, means connected to the jaws and operated by movement of the carriage to rotate the jaws, and operative during further movement of the carriage to hold the jaws from rotating.

12. In combination, a shiftably mounted carriage, levers pivoted to the carriage, means to move the levers, shafts journaled on said levers, jaws mounted on said shafts, sprocket wheels mounted on said shafts, other sprocket wheels mounted on the carriage, endless chains connecting the sprocket wheels on the shafts to the other sprocket wheels, a stationarily mounted shoulder extending lengthwise of the path of travel of the carriage, and an arm to turn one of the sprocket wheels on the carriage, the free end of said arm having its path of movement intersecting the shoulder.

13. In combination, a shiftably mounted carriage, jaws rotatively and shiftably mounted on the carriage, means operated by movement of the carriage to rotate the jaws, and means operated by movement of the carriage to shift the jaws.

14. In combination, a shiftably mounted carriage, jaws rotatively and shiftably mounted on the carriage, means to shift the carriage, means operated by said carriage-shifting means to shift the jaws, and means operated by movement of the carriage and in timed relation to the shifting of the jaws to rotate said jaws.

15. In combination, means to dump fruit from boxes, shiftably mounted rails to receive the empty boxes, and means to spread the rails apart to discharge the boxes therebetween.

16. In combination, means to dump boxes of fruit in succession, shiftably mounted rails to receive the empty boxes, and means operating in timed relation to the dumping means to spread the rails apart to discharge the boxes therebetween.

17. In combination, means to dump boxes of fruit in succession, shiftably mounted rails to receive the empty boxes, means operating to spread the rails apart, a guide above the level of the rails, a knocker-bar, and means to move the knocker-bar toward said guide.

18. In combination, means to dump boxes of fruit in succession, shiftably mounted rails to receive the empty boxes, means operating to spread the rails apart, a guide above the level of the rails, a knocker-bar, and means operated by the dumping means to move the knocker-bar toward said guide.

19. In combination, shiftably mounted box-dumping means provided with a trip, rails to receive the boxes from the box-dumping means, a guide above the level of the rails, a knocker-bar, and means connected to the knocker-bar to move said knocker-bar toward said guide, said means being operated by the trip during movement of the box-dumping means.

20. In combination, shiftably mounted box-dumping means provided with a trip, rails to receive the boxes from the box-dumping means, a pivoted knocker-bar, an arm connected to the knocker-bar, a connecting rod pivoted at one end to said arm and extending into the path of motion of the trip, and a swinging arm pivoted to the other end of the connecting rod.

21. In combination, a shiftably mounted carriage provided with shiftable and rotatable jaws, means to shift the carriage, means operated by movement of the carriage when the carriage is in one position to shift the jaws toward one another to hold a box therebetween and when the carriage is in another position to shift the jaws away from one another to release the box, and means operated by movement of the carriage to rotate the jaws when the carriage is in said first position, said means being inoperative to rotate the jaws when the carriage is in said other position.

22. In combination, a shiftably mounted carriage provided with shiftable and rotatable jaws, means to shift the carriage, shiftably mounted rails beneath the level of the carriage, means operated by movement of the carriage when the carriage is in one position to shift the jaws toward one another to hold a box therebetween and when the carriage is in another position to shift the jaws away from one another to drop the box onto said rails, means operated by movement of the carriage to rotate the jaws when the carriage is in said first position, said means being inoperative to rotate the jaws when the carriage is in said other position, and means to spread the rails apart to discharge the box therebetween.

23. In combination, a reciprocative carriage provided with shiftable and rotatable jaws, means to shift the carriage, shiftably mounted rails beneath the level of the carriage, a guide stationarily mounted above the rails, means operated by movement of the carriage at one end of its movement to shift the jaws toward one another to hold a box therebetween and operated by movement of the carriage at the other end of its movement to shift the jaws away from one another to drop the box onto said rails, means operated by movement of the carriage to rotate the jaws when the carriage is at the first mentioned end of its movement, said means being inoperative to rotate the jaws when the carriage is at said other end of its movement, means operated by rearward movement of the carriage to push the box toward the guide, and means to spread the rails apart to discharge the box therebetween.

24. In combination, shiftably mounted rails, means to move a box lengthwise on said rails, and means to spread the rails apart to discharge the box therebetween.

25. In combination, shiftably mounted rails, means to move a box lengthwise on said rails, and means operated by the box-moving means to spread the rails apart to discharge the box therebetween.

26. In combination, pivotally mounted arms, rails mounted on said arms, means to move a box lengthwise on said rails, and means operated by the box-moving means to spread the rails apart to discharge the box therebetween.

27. In combination, an endless chain, means to operate the chain, a trip on the chain designed to engage a box to move said box along the rails, and fingers projecting from the arms into the path of motion of the trip to move the arms and thereby spread the rails apart to discharge the box therebetween.

28. In combination, vertically extending endless elevator chains spaced apart to receive boxes therebetween, a conveyer at the lower ends of the elevator chains, lugs on the elevator chains designed to extend into the space between the chains in the downward movement of said lugs, means at the upper ends of the conveyer chains to intermittently drop boxes into said space, and means operating in timed relation to the box-dropping means, to operate the elevator chains at such rate of speed relative to the dropping of the boxes that several of the boxes will be supported at one time by the lugs, a conveyer to receive the boxes from the lugs, and means operative by movement of one of said lugs to engage one of said boxes after it has been deposited on the conveyer.

29. In combination, endless elevator chains spaced apart to receive boxes therebetween, lugs on the elevator chains designed to extend into the space between the chains, means to deposit a box on said lugs and to deposit other boxes at intervals one on another on the first named box to form a tier of boxes each supporting the one next above it, and means above the lower ends of the elevator chains to receive the tier of boxes when the lugs descend below the level of said tier-receiving means.

30. In combination, a shiftably mounted carriage, jaws rotatively connected to the carriage, an arm mounted on the carriage and operatively connected to the jaws to rotate said jaws, and a stationarily mounted stop designed to engage said arm when the carriage is shifted.

31. In combination, vertical endless chains having box-supporting means, means adjacent the upper ends of said chains to intermittently drop boxes on said box-supporting means, a conveyer between said chains and above the lower ends thereof to receive the boxes from the box-supporting means, an arm extending over the conveyer, means to operate the endless chains, and means including a member extending into the path of travel of the box-supporting means to move said arm.

32. In combination, vertical conveying means, horizontal rails extending over said conveying means, and means to spread said rails to discharge a box therefrom into the conveying means.

33. In combination, a reciprocative carriage provided with shiftable and rotatable jaws, means to shift the carriage, shiftably mounted rails beneath the level of the carriage, a guide stationarily mounted above the rails, means operated by movement of the carriage at one end of its movement to shift the jaws toward one another to hold a box therebetween and operated by movement of the carriage at the other end of its movement to shift the jaws away from one another to drop the box onto said rails, means operated by movement of the carriage to rotate the jaws when the carriage is at the first mentioned end of its movement, said means being inoperative to rotate the jaws when the carriage is at said other end of its movement, and means operated by rearward movement of the carriage to push the box toward the guide.

In testimony whereof, we have hereunto set our hands at Riverside California this 17th day of June 1915.

FRED STEBLER.
GEO. J. KUEHN.

In presence of—
P. T. SULLIVAN,
C. E. BROUSE.